A. J. LA VERNE.
TRACTOR TIRE.
APPLICATION FILED SEPT. 28, 1917.
1,281,177. Patented Oct. 8, 1918.
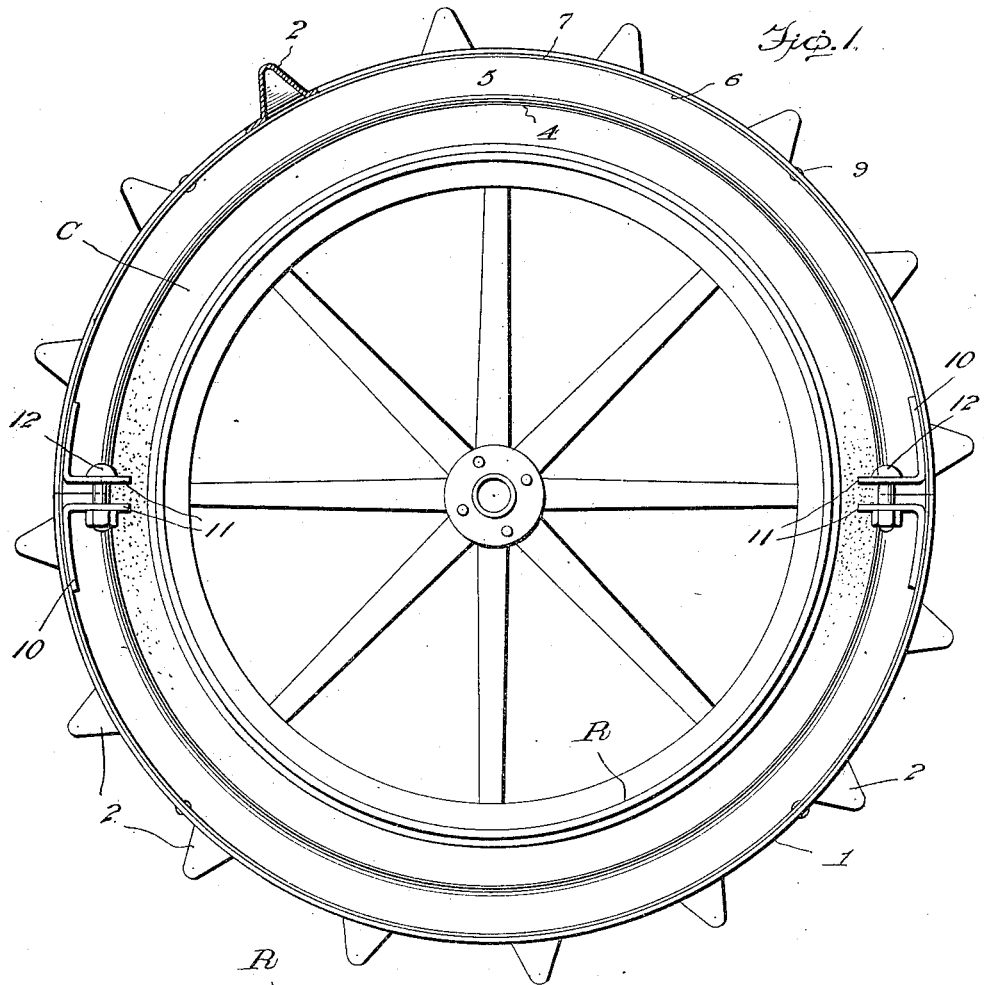
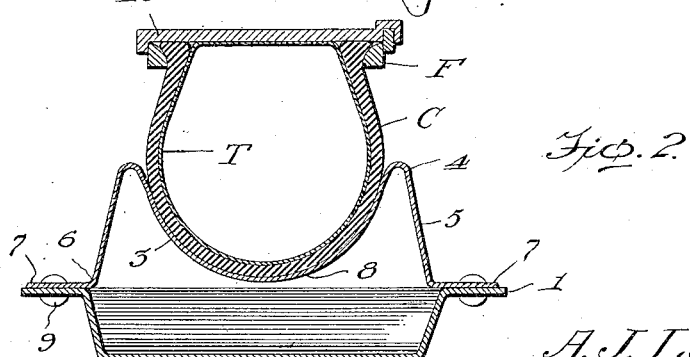
Witness
Inventor
A. J. La Verne
By Victor J. Evans
Attorney

UNITED STATES PATENT OFFICE.

ANDREW J. LA VERNE, OF DETROIT, MICHIGAN.

TRACTOR-TIRE.

1,281,177.  Specification of Letters Patent.  Patented Oct. 8, 1918.

Application filed September 28, 1917. Serial No. 193,781.

*To all whom it may concern:*

Be it known that I, ANDREW J. LA VERNE, a citizen of the United States, residing at Detroit, in the county of Wayne and State of Michigan, have invented new and useful Improvements in Tractor-Tires, of which the following is a specification.

This invention relates to traction wheels, and more especially to detachable tractor tires adapted for application to the exterior of automobile casings so as to convert the ordinary pneumatic tire into a broad-tread tractor tire with transverse ribs. Incidentally the application of the tractor tire protects the tread of the pneumatic tire, but as the former when in place constitutes a substantially rigid ring completely inclosing the latter, it may hardly be said to be a pneumatic tire cover or armor to the extent that it protects the soft tire while not detracting from its resiliency. In other words, this device is to be used more for the purpose of converting the wheel into a tractor wheel than for the purpose of protecting the pneumatic tire, and as a tractor wheel it need not be soft.

Details are set forth in the following specification, and reference is made to the accompanying drawings wherein:—

Figure 1 is a side elevation of a wheel, equipped with this invention, partly broken away and in section.

Fig. 2 is a cross section on an enlarged scale.

In the drawings the pneumatic tire casing C is shown as fastened to the rim R by means indicated broadly at F, and while I show an inner tube T, it is possible that the casing could contain some other kind of a core, or in fact it might be a solid rubber tire. Therefore where I speak of "casing" hereinafter I refer to the soft tire whatever its character.

The tractor tire forming the subject matter of the present invention is shown herein as made in two semi-circular halves, but it is of course quite possible to make it in smaller sections such as perhaps three or four to the circle, although if fitted accurately to the wheel to which it is to be applied, there is no necessity for more than two complementary sections. These are duplicates and a description of one will suffice. The numeral 1 designates the rim. This is a band or strip of rather heavy gage metal, somewhat wider than the soft tire C and perhaps twice as wide, as shown in the drawings, transversely flat, and longitudinally curved on an arc so that it follows closely the curvature of the tread side of the tire C, than which it is slightly larger. At intervals throughout the length of this rim the metal composing the same is struck up into ribs indicated at 2, and one of these is shown in section in Fig. 1 as substantially of V-shape. The idea is that the metal composing the rim shall be struck up to form these ribs, rather than that they shall be formed of other pieces of metal and attached to the rim. Eight ribs are shown in each section in the drawings, but I do not wish to be limited to their number.

Next inside the rim is disposed what I call the saddle. This also is made of a strip or band of sheet metal of somewhat lighter gage than that composing the rim, and is substantially W-shaped in cross section as seen in Fig. 2. That is to say, its center 3 is curved or arched to conform with the outer half of the casing C, and at each edge of the center is bent at an angle or nearly an angle 4, then it is carried outward in a flat leaf 5, and at the outer edge of the leaf it is bent again in an obtuse angle 6 and carried straight outward in a transversely flat flange 7. The two flanges stand in strict alinement with each other transversely of the saddle and are curved on an arc slightly larger than that of the bottom 8 of the curved center or channel 3 which embraces the tire C, and therefore when the parts are assembled as seen in Fig. 2 the bottom 8 of said channel is held out of contact with the transverse center of the flat rim 1 whereas the flanges 7 form feet which lie against said rim near its edges and may be secured thereto by any suitable means such as bolts or rivets 9. Thus it is the rather lighter gage metal of the saddle which makes contact with the tread face of the tire C, and under ordinary conditions and use the heavier gage metal of the rim 1 does not come into contact at all with the center 3 of the saddle as the latter is supported entirely by flanges or feet 7 at the edges.

Suitable means are now provided for fastening the ends of the sections to each other. As illustrated herein, L-shaped brackets 10 are secured on the inner faces of the flanges 7 near the ends of the saddle sections, and their inwardly projecting arms 11 are pierced with holes through which are passed bolts 12. At each point where two sections meet, there are two of these fastening devices, one near each edge of the tractor tire, and the nuts on the bolts are readily accessible as will be clear. This device may therefore be quickly applied to an ordinary automobile wheel. One section is passed into the angle between the rear side of each wheel and the ground, and the machine backed onto it, and then the other section is passed over the top of each wheel and the inner arms 11 of the brackets on the top section are brought down adjacent the corresponding arms of the brackets on the lower section, and the bolts 12 applied and their nuts tightened up. Attention is invited to the fact that riveting of the saddle at 9 along the edges of the rim and the attachment of the fastening devices to the saddle rather than to the rim, prevent the tendency of the ribs 2 of the rim 1 to straighten out when the nuts on the bolts 12 are tightened up. In other words, the saddle which is not ribbed or corrugated transversely serves as a reinforce to the rim which is so corrugated, and on the other hand the rim which is transversely flat throughout its width serves as a reinforce to the saddle which may be said to be corrugated transversely. Therefore each element of this device strengthens the other and yet it calls for the fewest number of parts and the simplest construction, resulting in ease of manufacture and cheapness in the tractor tire produced. I propose, of course, to make the device in sizes adapted to various automobile wheels, and it is also quite possible to make the parts in lighter or heavier grades according as the necessities of the case may demand.

What is claimed is:—

An attachment for automobile tires, comprising a band of sheet metal transversely curved to conform closely to and embrace the outer portion of the tire, the sides of said band at the edges of said transversely curved portion diverging outwardly and terminating in laterally directed flanges alining with each other, and a substantially cylindrical band secured upon said flanges, the sides of said first named band extending outwardly beyond the transversely curved portion thereof whereby the extreme outer periphery of said transversely curved portion will be spaced from the inner periphery of said second named band.

In testimony whereof I affix my signature.

ANDREW J. LA VERNE.

Witnesses:
C. A. YERGER,
ARTHUR E. BERGER.

Copies of this patent may be obtained for five cents each, by addressing the "Commissioner of Patents, Washington, D. C."